United States Patent [19]

Oda

[11] Patent Number: 5,425,549
[45] Date of Patent: Jun. 20, 1995

[54] VEHICLE WITH NOVEL AIRBAG UNIT INSTALLATION STRUCTURE

[75] Inventor: Yoshio Oda, Kure, Japan

[73] Assignee: Mazda Motor Corporation, Hiroshima, Japan

[21] Appl. No.: 215,768

[22] Filed: Mar. 22, 1994

[30]  Foreign Application Priority Data

Mar. 25, 1993 [JP] Japan .................. 5-066363

[51] Int. Cl.⁶ .............................................. B60R 21/16
[52] U.S. Cl. .................... 280/728.2; 280/732
[58] Field of Search ............................ 280/728 A, 732

[56]  References Cited

U.S. PATENT DOCUMENTS 5,087,067 2/1992 Seki et al. ............................ 280/732
5,135,253 8/1992 Hirashima et al. .................. 280/732
5,209,519 5/1993 Shiga et al. ...................... 280/728 A
5,230,530 7/1993 Iriyama et al. ...................... 280/732

FOREIGN PATENT DOCUMENTS 4-59450  2/1992  Japan .

*Primary Examiner*—Kenneth R. Rice
*Attorney, Agent, or Firm*—Keck, Mahin & Cate

[57]  ABSTRACT

In a vehicle airbag installation structure for installing an airbag unit equipped with an airbag lid inside the vehicle instrument panel so as to place the airbag lid in an opening formed in the instrument panel. The structure includes an airbag fitting member secured to the instrument panel, a support member transversely extending inside the instrument panel and a reinforcement bracket adjustably attached at one end to the support member and engaged at another end to either the rear of the airbag unit or the airbag fitting member to provide structural reinforcement.

8 Claims, 3 Drawing Sheets

VEHICLE WITH NOVEL AIRBAG UNIT INSTALLATION STRUCTURE

BACKGROUND OF THE INVENTION

1. Field of the Invention

The present invention relates to an automobile airbag system, and, in particular, to the structure for installing an airbag unit inside an instrument panel of an automobile.

2. Description of Related Art

Typically, passenger-side airbag systems are installed as a supplemental restraint system inside an instrument panel of a vehicle. Such a passenger-side airbag system has an airbag main unit, including an airbag housing, that contains an airbag and an inflator for inflating and expanding the airbag incorporated in the airbag housing. The airbag main unit is closed by an airbag lid attached to the rear opening of the airbag housing. This airbag system is installed inside the instrument panel so that the airbag lid is placed in an opening of the instrument panel and the airbag main unit is attached to and supported by a support member transversely extending inside the instrument panel. Such an airbag system is known from Japanese Unexamined Patent Publication No. 4-59450.

Regarding the structure for installing the airbag system inside the instrument panel, since there is usually some error in relative position between the instrument panel and the support member when the airbag main unit is attached to the support member, the airbag lid may not be correctly positioned in the opening of the instrument panel, e.g., may fail to be uniform or even with the instrument panel. Consequently, the asthetic appearance of the instrument panel including the airbag lid may be spoiled. Conversely, if, after having correctly positioned the airbag lid in the opening of the instrument panel so as to avoid unevenness or discontinuity of the airbag lid with the instrument panel, the attachment of the airbag main unit to the support member may be difficult owing to positional inconsistency between the airbag main unit and the support member.

Further, with such an airbag installation structure, during inflation and expansion of the airbag or when the airbag restrains the passenger, a large energy or external load is sustained by the airbag main unit in the lengthwise direction. This load may damage the fitting members of the airbag main unit to the instrument panel or cause the airbag main unit to shift. Such damages and positional shifts deteriorate the performance of the airbag. For this reason, in order for the airbag system to withstand such a large external load as sustained during expansion and to prevent any deterioration of restraint of the passenger due to damage of the fitting member of the airbag main unit and/or any positional shifting of the airbag main unit, greater support must be provided in a way that can easily be accomplished.

SUMMARY OF THE INVENTION

It is an object of the present invention to provide an installation structure for automobile airbag systems which enables an airbag unit to be installed inside an instrument panel with its airbag lid correctly placed in an opening of the instrument panel.

It is another object of the present invention to provide an installation structure for automobile airbag systems which can support an airbag unit on a support member with ease of aligment and high support strength.

These objects of the present invention are achieved by providing an installation structure for an automobile airbag unit, formed with a front opening through which an airbag expands toward a passenger seat and provided with an airbag lid which closes the front opening, which is disposed inside an instrument panel with the airbag lid placed in an opening formed in said instrument panel. The structure includes an airbag fitting member secured to the instrument panel for fitting the airbag unit to the instrument panel, and a reinforcement bracket attached at one end to a support member, transversely extending inside the instrument panel, and engaged at another end with the airbag unit or the airbag fitting member so as to structurally reinforce the airbag unit. The reinforcement member is adjustable in position relative to the support member.

With the structure for installing an airbag unit according to the present invention, the airbag unit is attached to the airbag fitting member which is secured integrally to the instrument panel with no discrepancy in relative position between the airbag unit and the instrument panel. This permits the installation of the airbag unit inside the instrument panel while correctly positioning the airbag lid in the opening of the instrument panel.

The rear edge of the airbag unit or the airbag fitting member is engaged with the anchoring and reinforcement brackets, having U-shaped hooks, which are secured to the support member and nip the rear edge from top and bottom, the airbag unit is restricted in movement both in vertical direction and in lengthwise direction. Consequently, when an external load is applied to the airbag unit in the lengthwise direction, it is adequately supported by these U-shaped hooks and there is no damage of the fitting member of the airbag unit and no shifting of the airbag unit in any direction, so as to prevent deterioration of passenger restriction performance.

The reinforcement anchoring brackets nip the rear edge of the airbag unit or the airbag fitting member from both top and bottom by means of U-shaped hooks. By providing a specific space or distance between the rear edge of the airbag unit or the airbag fitting member and the bottom end of the U-shaped hook, the airbag unit or the airbag fitting member is capable of movement within a specific distance in the lengthwise direction. Also, because the fitting position of these hooks can be vertically adjusted relative to the support member, even when there is initially any positional inconsistency in the vertical direction or in the horizontal direction between the rear edge of the airbag unit or the airbag fitting member and the support member, the rear edge can be joined to the support member so as to compensate for any positional inconsistency by simply anchoring the reinforcement anchoring brackets to the rear edge and connecting them to the support member at the U-shaped hooks.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENT

Before describing the present invention, it is to be noted that the term "front" as used herein relating to an airbag unit shall mean and refer to the direction in which the airbag inflates and expands and, however, as used relating to the vehicle shall mean and refer to the side toward the front end of the vehicle.

Figure 1:
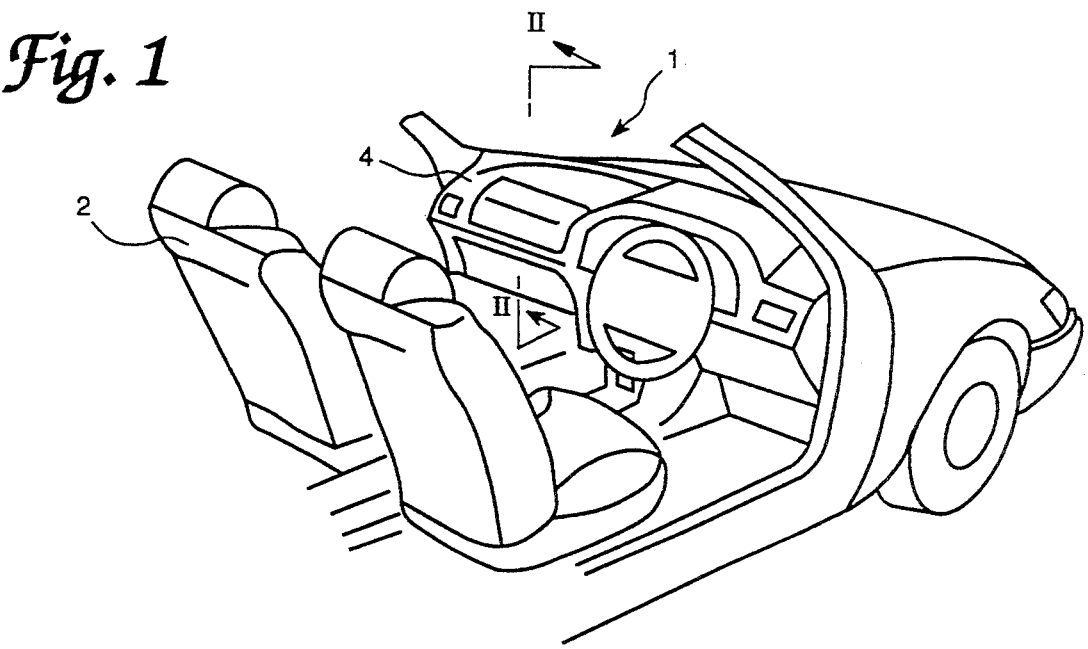
FIG. 1 is a schematic illustration showing the front section of a vehicle equipped with a passenger-side airbag system.
Figure 2:
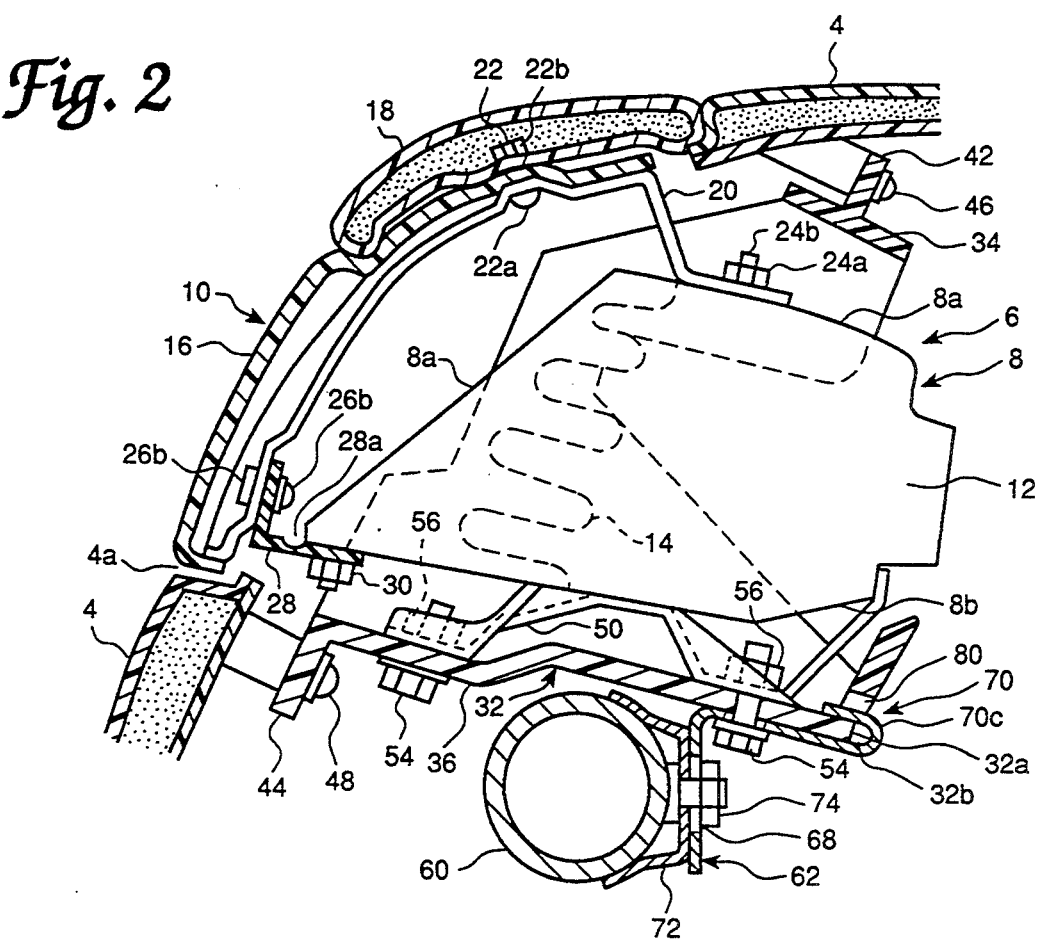
FIG. 2 is a cross-sectional view of FIG. 1 taken along line II—II.

Referring to the drawings in detail, and, in particular, to FIGS. 1 and 2, an airbag system 6 according to a preferred embodiment of the present invention is installed inside an instrument panel 4 in front of a front passenger seat 2 in a vehicle 1 as a passenger-side supplemental restraint unit for restraining a passenger sitting on the front passenger seat 2. The airbag system 6 is comprised of an airbag main unit 8 having a front opening 8a and an airbag lid 10 attached to the airbag main unit 8 so as to close the front opening 8a of the airbag main unit 8. This airbag main unit 8 is installed inside, i.e. on the front side of, the instrument panel 4 with its front opening 8a facing toward the rear of the vehicle 1, and the airbag lid 10 is positioned in an opening 4a formed in the instrument panel 4.

The airbag main unit 8 has an airbag housing 12 for accommodating therein an airbag 14 and an ignition and inflation system (not shown) for inflating and expanding the airbag 14. This ignition and inflation system is well known in the art and may be of any type well known to those skilled in the art. The airbag lid 10 is composed of an airbag lid main body 16 and a protective cover 18 that is attached to a front surface of the upper half of the airbag lid main body 16. The airbag lid main body 16 is provided with a hinge bracket 20. Both protective cover 18 and hinge bracket 20 are secured together to the airbag lid main body 16 by means of bolts 22a and nuts 22b. The upper part of the hinge bracket 20 is secured to a top wall 8b of the airbag housing 12 by means of bolts 24a and nuts 24b. One end of a connecting bracket 28 made of synthetic resin is secured by a bolt 26a and a nut 26b to a lower part of the hinge bracket 20, and the other end of the connecting bracket 28 is secured to a bottom wall 8c of the airbag housing 12 by means of a bolt 30a and a nut 30b. The connecting bracket 28 is formed with a notch 28a by means of which it is allowed to easily break.

The airbag system 6 includes an acceleration sensor (not shown) for detecting sudden deceleration of the vehicle due to a collision. Upon an occurrence of a collision, the airbag ignition system is caused in response to a signal from the acceleration sensor to supply inert gas onto the airbag 14 from the inflator so as to inflate and expand quickly the airbag 14 rearward through the front opening 8a of the airbag unit 8. During the expansion of he airbag 14, the airbag 14 forces the connecting bracket 28 to break at the notch 28a, so as to turn and flip the airbag lid 10 upwardly. Then, the airbag 14 further expands toward the rear of the vehicle into the passenger seat, so as to restrain and protect the passenger.

Figure 3:
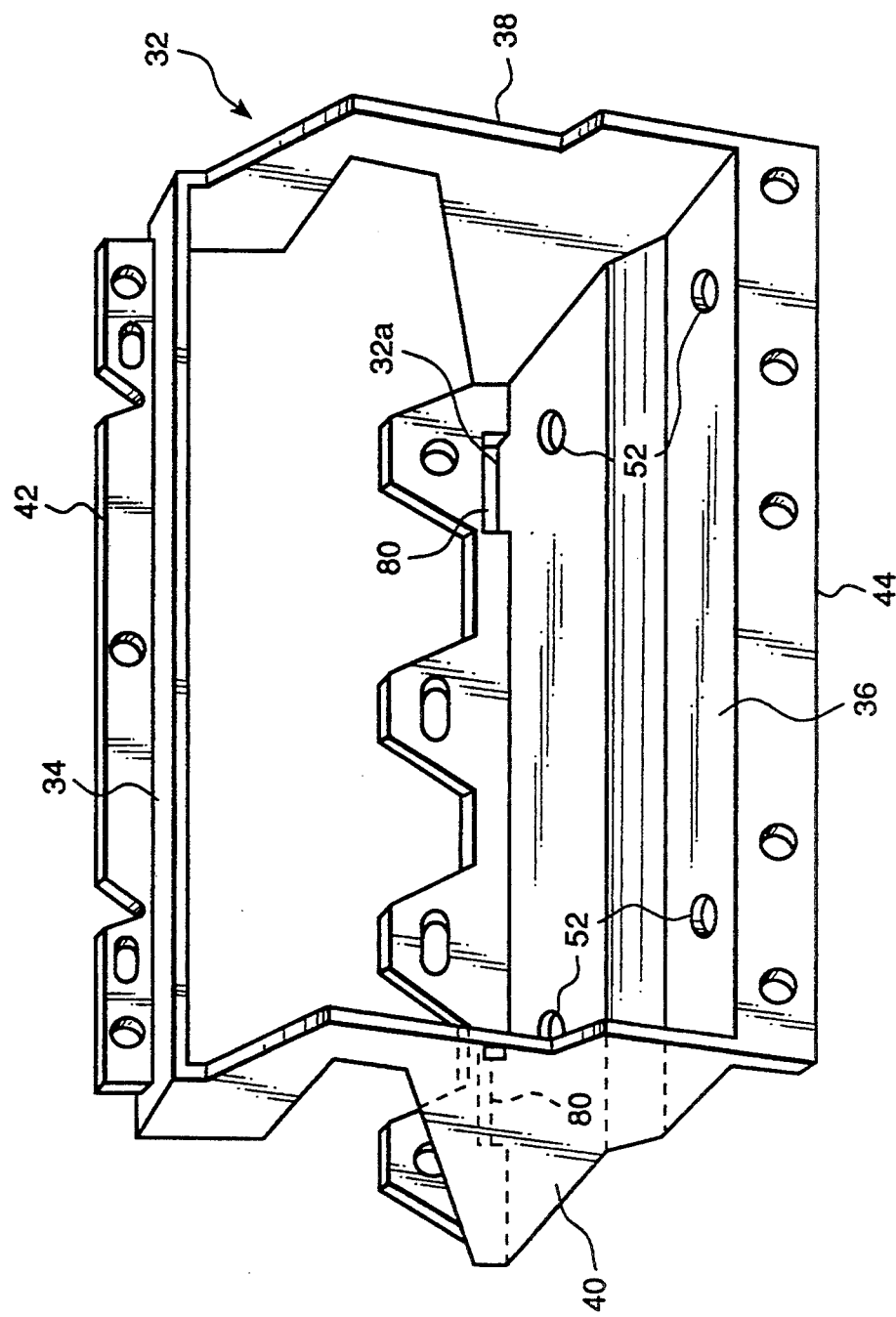
FIG. 3 is a perspective view showing an airbag fitting bracket.

The instrument panel 4 is provided with an airbag fitting 32 in close proximity of the instrument panel opening 4a which is firmly bolted, or otherwise secured, to the instrument panel 4 so as to be structurally integrated with the instrument panel 4. As shown in detail in FIG. 3, this airbag fitting 32, configured as a generally box-shaped frame with the front and back opened, is comprised of a top wall 34, a bottom wall 36, a left side wall 38 and a right side wall 40. The top and bottom walls 34 and 36 are formed with elongated flanges 42 and 44 extending along with rear edges, respectively. The airbag fitting 32 is secured to the instrument panel 4 by means of bolts 46 and 48 through the flanges 42 and 44. On the other hand, the airbag main unit 8 is provided with a mounting bracket 50 welded, or otherwise secured, to the bottom wall 36. After aligning four bolt holes 52 formed in the left and right sides of the bottom wall 36 of the airbag fitting 32 with corresponding bolt holes formed in the mounting bracket 50, bolts 54 are fastened by nuts 56 so as to secure the airbag main unit 8 to the airbag fitting 32. Further, a pipe-shaped support cross beam 60 transversely extends in front of the instrument panel 4 such that its opposite ends are connected to the left and right frames of the vehicle chassis. To the support cross beam 60 are connected anchoring brackets 62, which are anchored to the front edge of the airbag fitting 32.

Figure 4A:
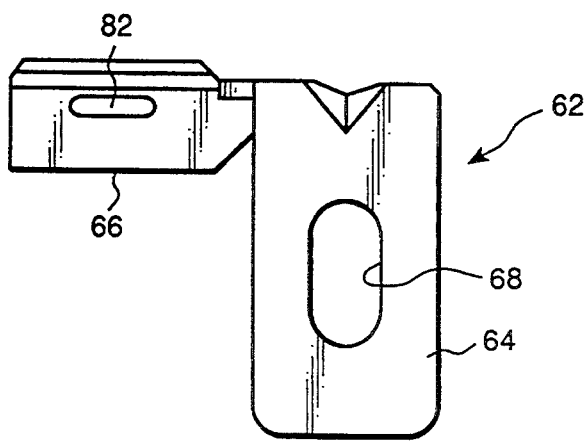
FIG. 4A is a front view of an anchoring bracket.
Figure 4B:
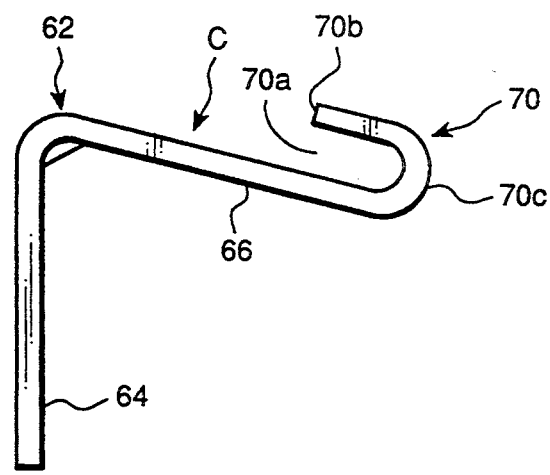
FIG. 4B is a right side view of the anchoring bracket.
Figure 4C:
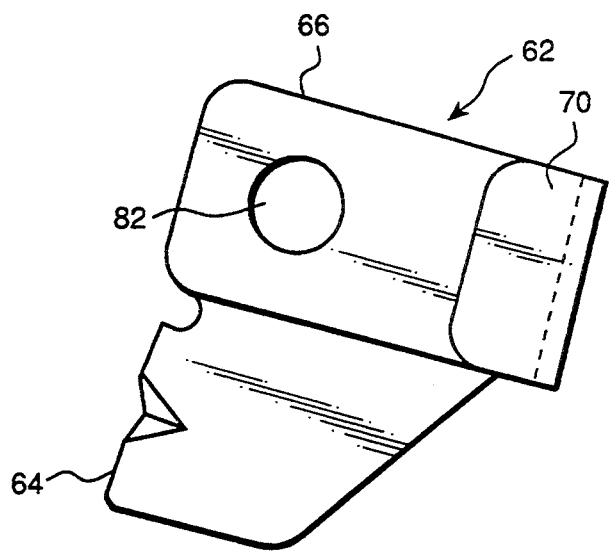
FIG. 4C is a view of the anchoring bracket as viewed in the direction indicated by arrow C in FIG. 4B.

Referring to FIGS. 4A to 4C, each of these anchoring brackets 62 is comprised of a connecting portion 64 and an anchoring portion 66 bent 90° with respect to the connecting portion 64. The anchoring bracket 62 is formed with a specific length of slot or oval hole 68, extending in the lengthwise direction, in the connecting portion 64 and a U-shaped hook 70, forming an open area 70a by a curved portion 70c on the rear side, at the tip end of the anchoring portion 66. The anchoring bracket 62 is connected to an attachment bracket 72 (see FIG. 2) secured to the support cross beam 60 at the connecting portion 64 by a bolt 74 through the oval hole 68.

The airbag fitting 32 is provided with insertion slots 80, formed in the rear portion of the bottom wall plate 36 thereof, into which the tip ends 70b of the U-shaped hooks 70 are inserted. The tip end 70b of the U-shaped hook 70 is inserted into the slot 80 so as to bring the U-shaped hooks 70 into engagement with the front edge 32a of the airbag fitting 32 from the front side, thereby nipping the front end portion of the airbag fitting 32. The anchoring bracket 62 is further provided with a circular hole 82, having a diameter larger than the diameter of a bolt 54, formed in the anchoring portion 66. The bolt 54 is passed through the hole 82 and fastened, securing the anchoring bracket 62 to the mounting bracket 50, and hence to the airbag fitting 32. In this instance, two anchoring brackets 62 are used with a specified transverse separation, each of these anchoring brackets 62 being connected to the attachment bracket 72, which is secured to the support cross beam 60 by means of a bolts and nut 74 passed through each of the oval holes 68 of the anchoring bracket 62. In order to anchor the U-shaped hook 70 to the front edge 32a of the airbag fitting 32, two insertion holes 80 are formed in the airbag fitting 32 with the same transverse separation as the two anchoring brackets 62 (see FIG. 3).

Before the installation of the airbag system 6, the attachment brackets 72 are welded onto the support cross beam 60. Then, the anchoring brackets 62 are anchored to the front edge 32a of the airbag fitting 32 by means of the U-shaped hooks 70 with the connecting portion 64 bolted to the attachment brackets 72. Subsequently, the airbag main unit 8 with the airbag lid 10 secured thereto is placed inside the instrument panel 4 through the instrument panel opening 4a bringing the bolt holes of the mounting bracket 50 into alignment with the bolt holes 52 in the bottom wall 36 of the airbag fitting 32. Thereafter, the airbag main unit 8 is attached to the airbag fitting 32 by the bolts 54 through both bolt holes 52 in the bottom wall 36 of the airbag fitting 32 and the bolt holes 82 in the anchoring portion 66 of the anchoring bracket 62. It is possible to connect the rear portion of the mounting bracket 50 to the bottom wall 36 of the airbag fitting 32 only in the same manner as the front portion of the mounting bracket 50.

As described above, the airbag system 6 is installed by securing the airbag main unit 8 to the airbag fitting 32. Because the airbag fitting 32 is structurally integral with the instrument panel 4, there occurs no disparity in relative position between airbag fittings 32 and instrument panels 4, so that, by simply securing the airbag main unit 8 to the airbag fitting 32, the airbag system 6 is installed in the instrument panel 4 with the airbag lid 10 correctly positioned in the instrument panel opening 4a.

In addition, because the front edge 32a of the airbag fitting 32 is anchored by the anchoring brackets 62 connected to the support cross beam 60 in such a manner that the U-shaped hooks 70 are fitted onto the front edge 32a of the airbag fitting 32 from the front so as to nip the front edge 32a from both above and below, the airbag fitting 32 is adjusted at the front edge 32a in vertical position by the hooks 70 and is restricted in lengthwise movement by the curved portion 70c of the U-shaped hooks 70, so that, when a load is applied to the airbag main unit 8 from the back toward the front of the vehicle, it is adequately received by the U-shaped hooks 70, thereby preventing parting, for instance, the flanges 42 and 44, of the airbag fitting 32 for the airbag main unit 8 to be subjected to damage from the load and/or the airbag main unit 8 to shift vertically and/or toward the front of the vehicle. Accordingly, the airbag system 6 is effectively prevented from any weakening of the performance of passenger restraint due to damage of the airbag fitting 32 and/or the shifting of the airbag main unit 8.

Furthermore, because the anchoring brackets 62 provide nipping support to the front edge 32a of the airbag fitting 32 from top and bottom by means of fitting the U-shaped hook 70 onto the front edge 32a from the front, by previously establishing a specific separation between the front end of this front edge 32a and the curved portion 70c of the U-shaped hook 70, see space 32b in FIG. 2, the front edge 32a is made capable of moving a specific distance in the lengthwise direction. Also, because the U-shaped hook 70 is adjustable in vertical position relative to the support cross beam 60, even if there is some error in vertical and/or horizontal relative position between the front edge 32a of the airbag fittings 32 and the support cross beam 60, see slot 68, the airbag fittings 32 is correctly joined at its front edge 32a to the support member 60 so as to compensate for any positional error by simply anchoring the anchoring bracket 62 to the front edge 32a of the airbag fittings 32 at the U-shaped hook 70 of the anchoring brackets 62 so as to connect it to the support cross beam 60.

It is to be understood that although the U-shaped hook 70 of the anchoring bracket 62 is anchored to the front edge 32a of the airbag fitting 32, nevertheless it may be anchored to the rear edge of the airbag housing 12 in a similar fashion with the same results. In addition, the front edge 32a of the airbag fitting 32 that effects anchoring in cooperation with the U-shaped hook 70 does not always necessarily have to be the exact front edge as described herein, but may comprise simply a front portion containing the front end. The anchoring brackets 62 may be equipped with any position adjustable connecting means in place of the oval hole or slot 68 formed in its connecting portion 64. In addition, although the airbag fitting 32 is shown as a separate part or component from the instrument panel 4 and directly bolted to the instrument panel 4, it may be is formed as an integral part of the instrument panel 4.

It is also to be understood that although the present invention has been described in detail with respect to a preferred embodiment, various other embodiments and variants may occur to those skilled in the art, which fall within the scope and spirit of the invention. Such other embodiments and variants are intended to be covered by the following claims.

What is claimed is:

1. In a vehicle including an airbag installation structure for installing an airbag unit in a vehicle and an airbag unit formed with a front opening through which an airbag expands toward a vehicle seat and provided with an airbag lid which closes said front opening, the airbag unit being disposed inside an instrument panel so as to place said airbag lid in an opening formed in the instrument panel, the improvement of said airbag installation structure comprising:

an airbag fitting member secured to said instrument panel for fitting said airbag unit to said instrument panel;

a support member transversely extending inside said instrument panel;

a reinforcement bracket attached at one portion to said support member and engaged at another portion to a rear part of at least one of said airbag unit and said airbag fitting member so as to structurally reinforce said one of said airbag unit and said airbag fitting member; and position adjusting means for adjusting the position of said reinforcement bracket relative to said support member.

2. In a vehicle as defined in claim 1, wherein said reinforcement bracket includes a restriction portion for restricting lengthwise movement of the rear part of said one of said airbag unit and said airbag fitting member.

3. In a vehicle as defined in claim 1, wherein said reinforcement bracket includes a restriction portion for restricting vertical movement of the rear part of said one of said airbag unit and said airbag fitting member.

4. In a vehicle as defined in claim 1, wherein said reinforcement bracket includes a restriction portion for restricting vertical and lengthwise movement of the rear part of said one of said airbag unit and said airbag fitting member.

5. In a vehicle as defined in claim 4, wherein said restriction portion is formed integrally with said reinforcement bracket and is configured as a generally U-shaped hook.

6. In a vehicle as defined in claim 5, wherein said generally U-shaped hook is engaged with said rear part with clearance to allow lengthwise movement of said one of said airbag unit and said airbag fitting member relative to said reinforcement bracket.

7. In a vehicle as defined in claim 5, wherein said generally U-shaped hook nips said rear part to allow lengthwise movement of said one of said airbag unit and said airbag fitting member relative to said reinforcement bracket.

8. In a vehicle as defined in claim 1, wherein said position adjusting means comprises a slot formed in said reinforcement bracket and fastening means received through said slot for relative sliding adjustment for adjustably fastening said reinforcement bracket to said support member.

* * * * *